United States Patent [19]

Pringle

[11] Patent Number: 4,534,414
[45] Date of Patent: Aug. 13, 1985

[54] HYDRAULIC CONTROL FLUID COMMUNICATION NIPPLE

[75] Inventor: Ronald E. Pringle, Houston, Tex.
[73] Assignee: Camco, Incorporated, Houston, Tex.
[21] Appl. No.: 565,324
[22] Filed: Dec. 27, 1983

Related U.S. Application Data

[63] Continuation-in-part of Ser. No. 440,667, Nov. 10, 1982, Pat. No. 4,460,046.

[51] Int. Cl.³ .............................................. E21B 34/10
[52] U.S. Cl. .................................... 166/317; 166/332; 166/376; 166/72; 137/68 R
[58] Field of Search ............... 166/317, 332, 376, 318, 166/72; 137/68 R

[56] References Cited

U.S. PATENT DOCUMENTS

| | | | |
|---|---|---|---|
| 2,737,195 | 3/1956 | Baker et al. | 166/317 |
| 3,024,846 | 3/1962 | Gage | 166/317 |
| 3,786,863 | 1/1974 | Tausch | 166/72 |
| 3,786,866 | 1/1974 | Tausch et al. | 166/224 |
| 3,799,258 | 3/1974 | Tausch | 166/72 |
| 4,119,146 | 10/1978 | Taylor | 166/72 |

*Primary Examiner*—Stephen J. Novosad
*Assistant Examiner*—M. Goodwin
*Attorney, Agent, or Firm*—Fulbright & Jaworski

[57] ABSTRACT

A hydraulic control communication nipple for switching control fluid in a fluid passageway from one location to a second location. A metal plug is aligned with a portion of the fluid passageway and is positioned to be engaged by a vertically moving sleeve and moved into said portion to shut off fluid communication to a first location. The plug is a frangible plug that includes a longitudinal axis extending vertically into the passageway and includes threads screwed into and forming a metal-to-metal seal with the passageway. The movement of the plug into the portion of the passageway may also open communication of the passageway with the second location. For alternately opening the passageway to a second location, a metal breakable screw having a longitudinal axis extending vertically into the passageway adjacent the second location has threads screwed into and initially blocks the passageway with a metal-to-metal seal. The screw includes a cavity exposed to the passageway. The vertically moving sleeve is connected to the screw and is adapted to break the screw in tension and expose the cavity to the interior of the well tool.

6 Claims, 4 Drawing Figures

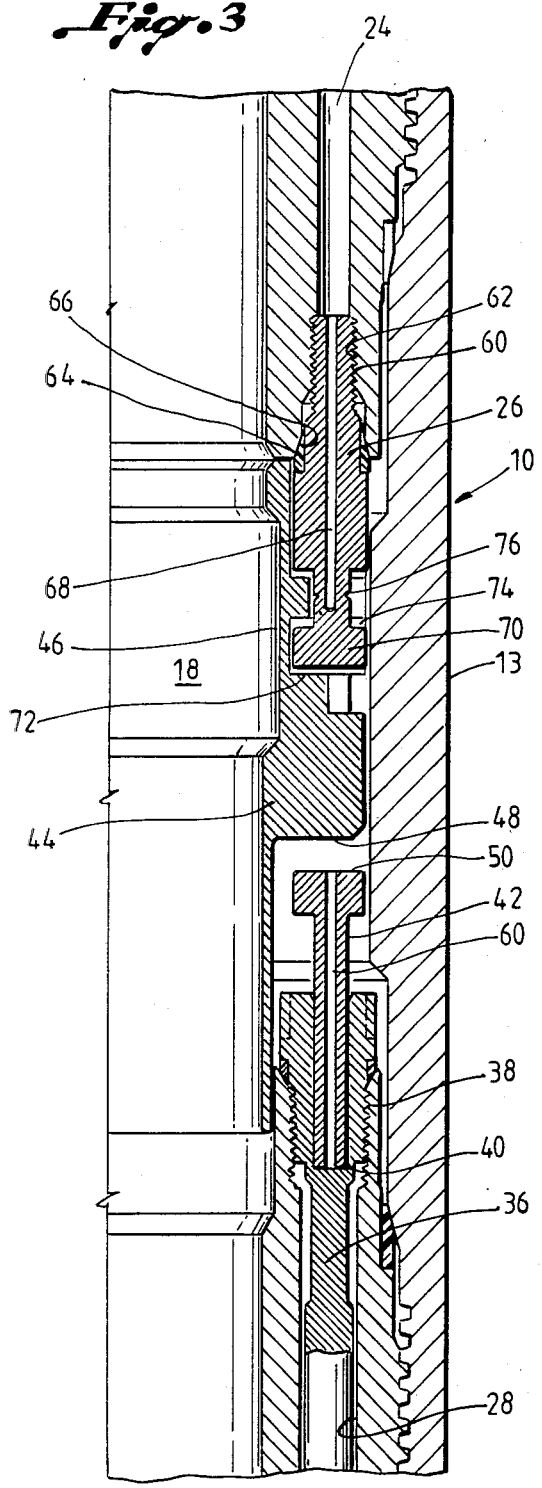
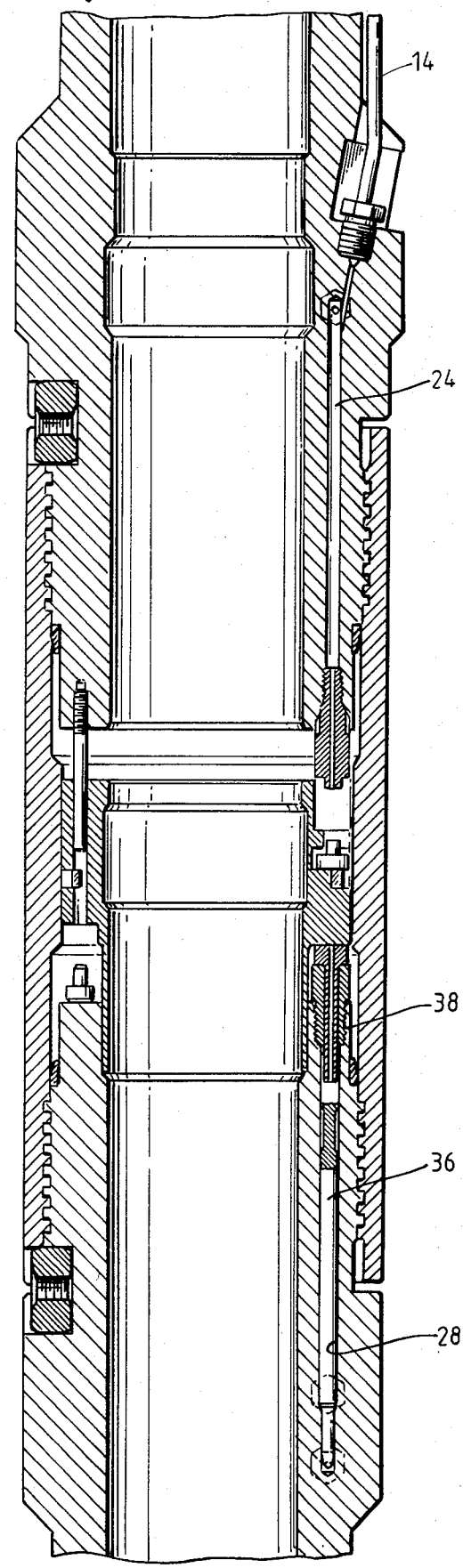

HYDRAULIC CONTROL FLUID COMMUNICATION NIPPLE

CROSS REFERENCES TO RELATED APPLICATIONS

This application is a continuation-in-part of my copending patent application Ser. No. 06/440,667, filed Nov. 10, 1982, entitled Control Fluid Communication Nipple, now U.S. Pat. No. 4,460,046.

BACKGROUND OF THE INVENTION

It is known to open fluid communication of a fluid passageway to the interior of a well tool for controlling a second well tool as shown in U.S. Pat. Nos. 3,786,866 and 3,799,258. My copending patent application Ser. No. 440,667 above identified overcomes the problems of the prior art and is directed to a fluid communication nipple for initially blocking the communication of fluid from a fluid passageway to the inside of a well tool but being openable when desired without the use of elastomer seals, is broken in tension to provide fluid flow, and is positioned so as not to interfere with wall thickness.

The present invention is directed to an improved hydraulic control fluid communication nipple, which in addition to having the ability to communicate control fluid to a second location, also has the ability to abandon or plug communication to the main or first location. The present hydraulic control nipple avoids the use of elastomers for providing an apparatus for high pressure, high temperature and subsea completions. Besides being able to plug communication to a first location, the present communication nipple can, in the event of a seal failure at the first location, isolate the leak whereby it will not adversely affect the operating equipment positioned at the second location.

SUMMARY

The present invention is directed to a hydraulic control fluid communication nipple for switching control fluid from one location to a second location and includes a body, a fluid passageway in the body adapted to be connected to the well surface for normally receiving hydraulic control fluid for supplying hydraulic control fluid to a first location. Vertical moving means in the body shuts off communication of the fluid to the first location and opens communication of the fluid passageway to a second location in the body.

A further object of the present invention is wherein a metal plug is aligned with a portion of the fluid passageway and is positioned to be engaged by the vertical moving means and is moved into said portion to shut off communication of fluid to the first location with a metal seal. Preferably the metal plug has a longitudinal axis extending vertically and is threadably connected in the passageway forming a metal seal and having a frangible connection.

A further object is the provision of a stem coaxially aligned with and telescopically extending into the plug for engagement by the vertically moving means for breaking the frangible connection and moving the plug.

Still a further object of the present invention is wherein the plug normally blocks communication of the fluid passageway with the second location, and movement of the plug into said one portion opens communication of the passageway with the second location.

A still further object of the present invention is wherein means are provided in the body for opening communication of the fluid passageway to the second location including a metal frangible screw having a longitudinal axis extending vertically and having threads screwed into and blocking the passageway adjacent the second location with a metal-to-metal seal. The screw includes a cavity exposed to the passageway, and said screw is engagable by the vertical moving means to break the screw in tension and expose the cavity to the second location.

The present invention is directed to a communication nipple which opens communication at a second location while closing communication of the control fluid to a first location using frangible elements at each location which are broken in tension and which avoid elastomer seals by providing metal-to-metal seals.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 3 is a fragmentary elevational view, in cross section in an enlarged scale, showing the parts of the communication nipple in the initial position, and FIG. 4 is a fragmentary elevational view, in cross section, showing the nipple of the present invention in its actuated position.

DESCRIPTION OF THE PREFERRED EMBODIMENT

Figure 1:
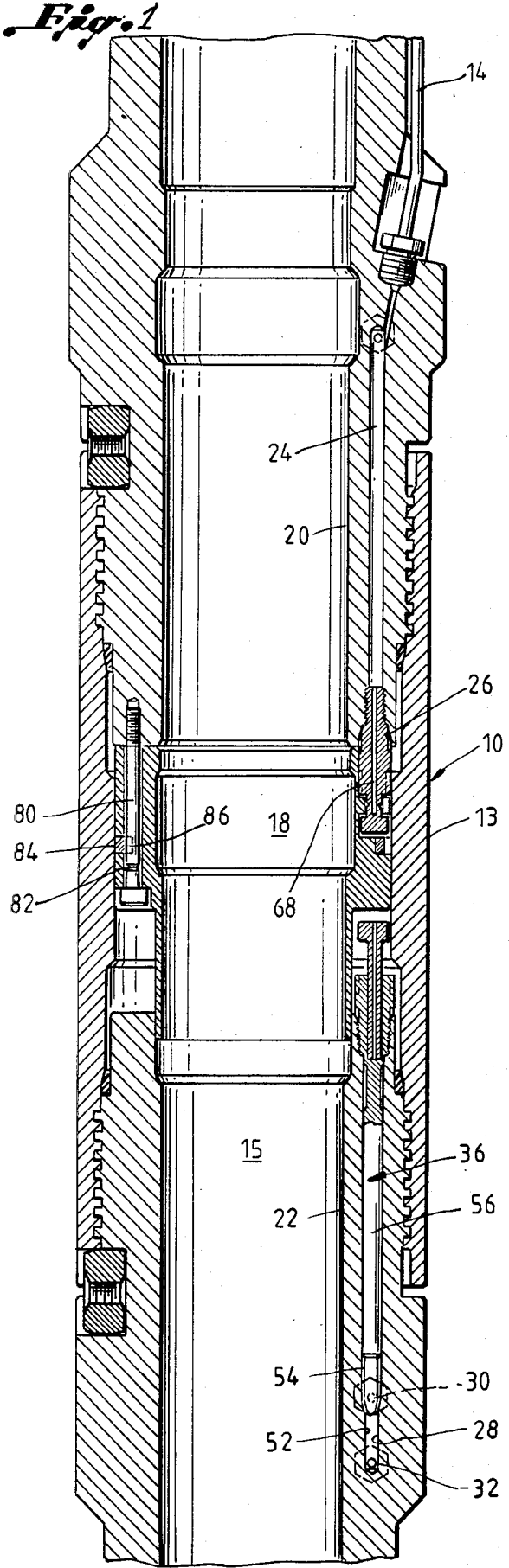
FIG. 1 is a fragmentary elevational view, in cross section, of the hydraulic control fluid communication nipple of the present invention.
Figure 2:
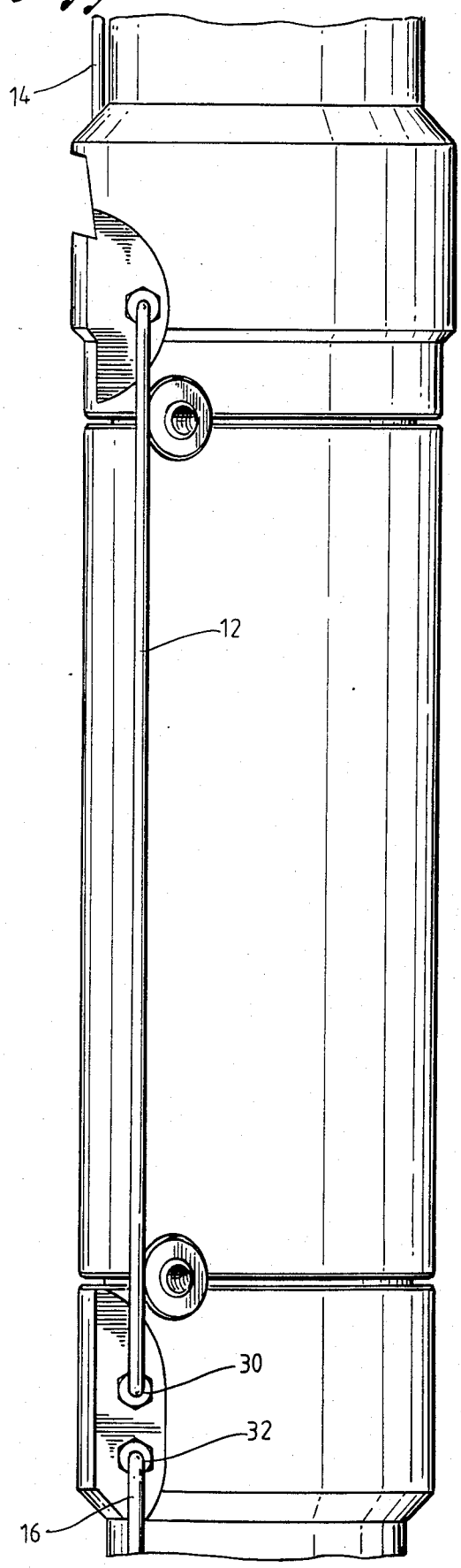
FIG. 2 is a fragmentary elevational view of the apparatus of FIG. 1.

Referring now to the drawings, the reference numeral 10 generally indicates the hydraulic control fluid communication nipple of the present invention which includes a fluid passageway 12 connected to a body 13 of the nipple 10. The passageway 12 is adapted to be connected through a line 14 to a well surface for normally receiving hydraulic control fluid for supplying hydraulic control fluid to a first location such as a line 16 or alternately to a second location such as the interior location 18 of the nipple 10. The present invention may be used, as more fully described in my copending patent application Ser. No. 440,667, which is incorporated herein by reference, in a tubing of an oil and/or gas well for normally supplying control fluid to a tubing safety valve through the first location line 16 and in the event of a failure of the first safety valve to a second retrievable safety valve positioned in the interior bore 15 of the nipple 10 for receiving control fluid in the second location 18 between the polished sections 20 and 22 to operate the second safety valve. However, it is to be recognised that the present invention may be useful in controlling and communicating fluid for actuating various types of well tools.

As indicated, the communication nipple 10 is positioned in the tubing of an oil and/or gas well and the line 14 extends to the well surface for receiving control fluid therefrom. The line 14 supplies hydraulic fluid to an internal passageway 24 in the nipple which extends vertically to a position adjacent the second location 18 in the bore of the nipple 10. Therefore, fluid may be supplied from the well surface through the line 14, the passageway 24, and into the bore 15 of the nipple 10 at the location 18 when the passageway 24 is open. However, initially when there is no tool in the bore 15 of the nipple 10 to be actuated, there is no need for hydraulic control fluid at the location 18. And a metal frangible member generally indicated by the reference numeral 26 is provided extending vertically into, sealing in, and blocking the flow of control fluid through the passageway 24.

Initially, the control fluid from the control line 14 is communicated through the line 12 to a fluid passageway portion 28 in the nipple 10 through a port 30 and out of the passageway portion 28 through a second port 32 to the first location line 16. The first location line 16 may extend, for example, downwardly in the well tubing to actuate a first tubing safety valve as shown in my copending patent application Ser. No. 440,667. However, in the event that the primary or tubing safety valve becomes inoperative, it is desirable to position a second or retrievable type safety valve in the polished bores 20 and 22 of the nipple 10 in which the second safety valve is controlled by fluid in the passageway 24 supplied to the second location 18. The present invention is directed to also shutting off the flow of hydraulic fluid to the first location line 16 in this event. This becomes particularly important in the event that the failure and the equipment connected to the first location line 16 is caused by a seal failure. It is desired to cut off the supply to the first location line 16 so that any leak connected to the line 16 will not adversely affect the redundant safety valve positioned in the bore 15 of the nipple 10 that is receiving control fluid from the second location 18. Therefore, the present invention is generally directed to providing a hydraulic control communication nipple 10 which switches control fluid from the first location line 16 to a second location 18. That is, the control fluid is normally supplied from the well surface through the line 14 for supplying hydraulic control fluid to the first line 16, but in the event of the failure of the equipment connected to the line 16, the nipple 10 of the present invention is actuated to open the communication between the passageway 24 and the second location 18 for supplying control fluid at the second location 18 and also shutting off communication of the fluid in the line 14 to the first location line 16.

Referring now to FIGS. 1, 3 and 4, a metal frangible member, such as for example a plug 36 is provided extending vertically into the portion 28 of the passageway. Initially, the plug 36 is screwed into the end of the passageway 28 by coacting metal threads 38 to provide a metal-to-metal seal. The metal seal is advantageous over usual elastomer seals as it can withstand the hostile environment of high temperatures and corrosive fluids which are present in many wells. The plug 36 in its initial screwed in position is in a retracted position and does not block flow between the ports 30 and 32. Thus, control fluid from line 14 flows through passageway 12, through ports 30 and 32 and to the first location line 16. The plug 36 includes a thin section 40 which may be readily broken, as will be more fully described hereinafter, to allow the plug 36 to be moved downwardly into a blocking position, as best seen in FIG. 4, to shut off communication between the ports 30 and 32 and thus shut off communication of the control fluid from the line 14 to the line 16.

A stem 42 is provided aligned with and telescopically extending into the top of the plug 36. A vertically moving sleeve 44 is provided having a notch 46 for actuation by a conventional well tool. The sleeve 44 is telescopically movable in the body 13 of the nipple 10, and includes a first shoulder 48 for engagement with the top 50 of the stem 42. Downward movement of the sleeve 44 moves the stem 42 downwardly to break the frangible connection at the thin section 40 and the stem 42 drives the plug 36 downwardly to close off the fluid passageway between the ports 30 and 32. It is also to be noted that the metal plug 36 seals in the portion 28 of the passageway between the ports 30 and 32 with a metal-to-metal seal. Preferably, the lower portion 52 of the portion 28 of the passageway is of a reduced diameter as is the lower portion 54 of the plug 36 to allow the machining of a closer and better sealing fit.

If desired, the movement of the plug 36 can be used not only to shut off the supply of control fluid to the first location line 16, but may also be used to provide fluid communication from the line 14, through the line 12, and port 30 to the second location 18 in the bore 15 of the nipple 10 for actuating a well tool therein. That is, fluid may flow from the port 30 around the upper portion 56 of the plug 36, around the stem 42 or through a hole 60 in the stem 42, and around the sleeve 44 (there are no seals between the sleeve 44 and the body 13) and to the second location 18. The volume of fluid will depend upon the clearances between the plug 36 and the portion 28 of the passageway, the clearances around the stem 42 or the size of the hole 60, and the clearance between the sleeve 44 and the body 13.

However, the preferred method and structure of providing communication of the control fluid in the line 14 to the second location 18 in the body 13 is by way of the passageway 24 and frangible screw 26. The structure and operation of the frangible screw 26 is similar to that described in my copending patent application Ser. No. 440,667. That is, the screw 26 extends vertically into and initially blocks the flow of control fluid through the passageway 24. The screw 26 includes threads 60 for coacting with threads 62 in the body 13 for securing the screw 26 therein. Sealing of the passageway 24 by the screw 26 is accomplished by coacting metal surfaces 64 and 66 of the screw 26 and body 13, respectively. These metal sealing surfaces are preferable tapered and are advantageous over the usual elastomer seals in withstanding the environmental conditions. The screw 26 includes a cavity 68 exposed to the passageway 24, and the screw 26 includes means such as a head 70 for gripping and fracturing the screw 26 for opening communication of the passageway 24 with the second location 18 of the bore 15 of the nipple 10. The vertically positioned screw 26 is advantageous in that it does not require the wall of the housing 13 to be as thick as if the member 26 were horizontal.

The vertically moving breaking sleeve 34 includes a recess 72 for receiving the head 70 of the screw 26. On one side of the recess 72 the sleeve 44 includes a shoulder 74 adapted to contact and engage the head 70 and pull the screw 26 in tension to break the screw 26 and expose the cavity 68 to the second location 18 in the bore 15 of the nipple 10 when the sleeve 44 is moved downwardly away from the screw 26. If desired, a notch 76 may be placed around the exterior of the screw 26 to aid in positioning or controlling the place of the break. It is advantageous to break the member 26 by tension pull as the cavity 68 does not get blocked or closed as in the case of a transverse shear.

The recess 46 of the sliding sleeve 44 is exposed in the bore 15 to other types of downhole tools, which might engage the recess 46 and accidentally actuate the plug 36 and screw 26 at an undesired time. Therefore, referring now to FIG. 1, one or more frangible bolts 80 are provided for initially holding the sliding sleeve 44 against movement. The bolts 80 are secured to the body 13 and extend vertically to allow vertical movement of the sleeve 44 and initially hold the sleeve shoulders 74 and 48 out of vertical contact with the screw head 70 and the stem 42, respectively, so that any accidental bumping of the recess 46 by other well tools will not actuate the communication nipple 10. However, when the sleeve 44 is actuated, the bolt 80 is broken about an indentation 82, thereby releasing the sleeve 44 for contact with the head 70 of the screw 26 and breaking the screw 26 and also contacting the stem 42 to break the plug 36.

After the bolt 80 and screw 26 are broken, it is desirable that the broken parts of the screw 26 remain separated in order to insure that the fluid flow through the passageway is not blocked. An expanded lock C-ring 84 may be provided in a recess 86 in the sleeve 44 adjacent the indentation 82. The ring 84, when the bolt 80 is broken, contracts into the space between the broken part of the bolts 80 (FIG. 4). The contraction of the ring 84 keeps the sleeve 44 and thus the head 70 in a downward position thereby keeping the broken parts of the screw 26 separated.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will readily suggest themselves to those skilled in the art and which are encompassed within the spirit of the invention and the scope of the appended claims.

What is claimed is:

1. A hydraulic control fluid communication nipple for switching control fluid from one location to a second location in a well tool comprising,
a body,
a fluid passageway in the body adapted to be connected to the well surface for normally receiving hydraulic control fluid for supplying hydraulic control fluid to a first location,
vertically moving means in the body shutting off communication of fluid to said first location,
said vertically moving means in the body opening communication of said fluid passageway to a second location in the body,
a metal plug aligned with a portion of said fluid passageway and positioned to be engaged by the vertically moving means and moved into said portion and shut off communication of fluid to said first location with a metal seal,
said metal plug has a longitudinal axis extending vertically and is threadedly connected in the passageway forming a metal seal and having a frangible connection.

2. The apparatus of claim 1 including,
a stem coaxially aligned with and telescopically extending into the plug for engagement with the vertically moving means for breaking the frangible connection and moving said plug.

3. A hydraulic control fluid communication nipple for switching control fluid from one location to a second location in a well comprising,
a body,
a fluid passageway in the body adapted to be connected to the well surface for normally receiving hydraulic control fluid for supplying hydraulic control fluid to a first location,
vertically moving means in the body shutting off communication of fluid to said first location, and
said vertically moving means in the body opening communication of said fluid passageway to a second location in the body,
the means in the body opening communication of said fluid passageway to a second location in the body includes,
said passageway extending to said second location,
a metal frangible screw having a longitudinal axis extending vertically and having threads screwed into and blocking the passageway adjacent the second location with a metal-to-metal seal,
said screw having a cavity exposed to the passageway,
a vertically moving breaking sleeve positioned to engage and break the screw in tension and expose the cavity to the second location.

4. A hydraulic control fluid communication nipple for switching control fluid from one location to a second location in a well tool comprising,
a body,
a fluid passageway in the body adapted to be connected to the well surface for receiving hydraulic control fluid for supplying hydraulic control fluid to a first and a second location,
a metal plug aligned with a portion of said fluid passageway and positioned to be moved into said portion and shut off communication of fluid to said first location, said plug normally being positioned out of said portion whereby hydraulic fluid can be supplied to said first location,
a metal breakable screw having a longitudinal axis extending vertically into the passageway adjacent the second location and having threads screwed into and initially blocking said passageway with a metal-to-metal seal, said screw having a cavity exposed to the passageway, and
a vertically moving breaking sleeve positioned to engage said screw and break said screw in tension and expose the cavity to the second location and said sleeve adapted to engage move said plug into said portion of the passageway for shutting off communication of said passageway with the first location.

5. The apparatus of claim 4 wherein said metal plug is a frangible plug and includes a longitudinal axis extending vertically into the passageway and having threads screwed into and forming a metal-to-metal seal with the passageway.

6. The apparatus of claim 5 wherein said plug when moved into said portion of the passageway shuts off communication to said first location with a metal-to-metal seal.

* * * * *

UNITED STATES PATENT OFFICE
CERTIFICATE OF CORRECTION

Patent No. 4,534,414          Dated  August 13, 1985

Inventor(s)  Ronald E. Pringle

It is certified that error appears in the above-identified patent and that said Letters Patent are hereby corrected as shown below:

Column 6, line 52, after "engage" insert -- and --

Signed and Sealed this

Tenth Day of December 1985

[SEAL]

*Attest:*

DONALD J. QUIGG

*Attesting Officer*  *Commissioner of Patents and Trademarks*